(12) United States Patent
Marcos Izquierdo et al.

(10) Patent No.: US 12,286,890 B2
(45) Date of Patent: Apr. 29, 2025

(54) GUTTER FOR RECOVERING LUBRICATION OIL FOR A MECHANICAL REDUCER COMPRISING AN IMPROVED DEFLECTOR

(71) Applicant: SAFRAN TRANSMISSION SYSTEMS, Colombes (FR)

(72) Inventors: Juan-Luis Marcos Izquierdo, Moissy-cramayel (FR); Mohamed Bouyakoub, Moissy-cramayel (FR); Antoine Jacques Marie Pennacino, Moissy-cramayel (FR); Jérémy David Seban, Moissy-cramayel (FR); Jordane Emile André Peltier, Moissy-cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/532,732

(22) Filed: Dec. 7, 2023

(65) Prior Publication Data
US 2024/0191635 A1   Jun. 13, 2024

(30) Foreign Application Priority Data
Dec. 9, 2022   (FR) ...................................... 2213106

(51) Int. Cl.
*F16H 57/04*   (2010.01)
*F01D 25/18*   (2006.01)

(52) U.S. Cl.
CPC ......... *F01D 25/18* (2013.01); *F16H 57/0423* (2013.01); *F16H 57/0486* (2013.01);
(Continued)

(58) Field of Classification Search
CPC .. F01D 25/18; F16H 57/0423; F16H 57/0486; F16H 57/0408;
(Continued)

(56) References Cited

U.S. PATENT DOCUMENTS 5,472,383 A * 12/1995 McKibbin ........... F16H 57/0482
184/6.12
5,494,355 A * 2/1996 Haase ..................... F01D 9/065
384/135

(Continued)

FOREIGN PATENT DOCUMENTS

EP        1925855 B1    9/2015
GB        369875 A  *   3/1932

OTHER PUBLICATIONS

Search Report issued in French Application No. 2213106, mailed on May 24, 2023.

*Primary Examiner* — Sherry L Estremsky
(74) *Attorney, Agent, or Firm* — Bookoff McAndrews, PLLC

(57) ABSTRACT

A gutter for recovering lubrication oil, particularly for a mechanical reducer, comprising un corps principal comprising an annular main body around a central axis, and a deflector attached to the main body and configured to allow the evacuation of the oil radially from an inner cavity of the main body toward the outside of the gutter, the deflector comprising a main sleeve disposed in the extension of the main body, and an evacuation channel configured to deflect oil from the main sleeve and having a curved shape such that a first end of the evacuation channel, communicating with the inner cavity, is tangent to the main body, and a second end of the evacuation channel is directed outward with respect to the annular main body.

13 Claims, 6 Drawing Sheets

(52) U.S. Cl.
CPC ............... *F05D 2260/40311* (2013.01); *F05D 2260/609* (2013.01); *F05D 2260/98* (2013.01)

(58) Field of Classification Search
CPC ..... F05D 2260/40311; F05D 2260/609; F05D 2260/602; F16N 31/02; F16N 2210/12; F16N 2210/08
See application file for complete search history.

(56) References Cited

U.S. PATENT DOCUMENTS

| | | | |
|---|---|---|---|
| 6,223,616 B1 | 5/2001 | Sheridan | |
| 7,789,200 B2* | 9/2010 | Munson | F01D 25/20 |
| | | | 184/6.12 |
| 8,020,665 B2* | 9/2011 | Sheridan | F02C 7/36 |
| | | | 184/6.12 |
| 8,511,057 B2* | 8/2013 | Fomison | F01D 25/18 |
| | | | 60/39.08 |
| 8,708,863 B2* | 4/2014 | McCune | F01D 5/027 |
| | | | 475/159 |
| 9,404,381 B2* | 8/2016 | NguyenLoc | F16H 57/0441 |
| 10,287,915 B2* | 5/2019 | McCune | F01D 25/18 |
| 10,890,247 B2* | 1/2021 | Gravina | F16H 57/0456 |
| 11,125,318 B2* | 9/2021 | Chevillot | F16H 57/0456 |
| 11,391,364 B2* | 7/2022 | Baraggia Au Yeung | |
| | | | F16H 57/0435 |

* cited by examiner

[Fig. 1]
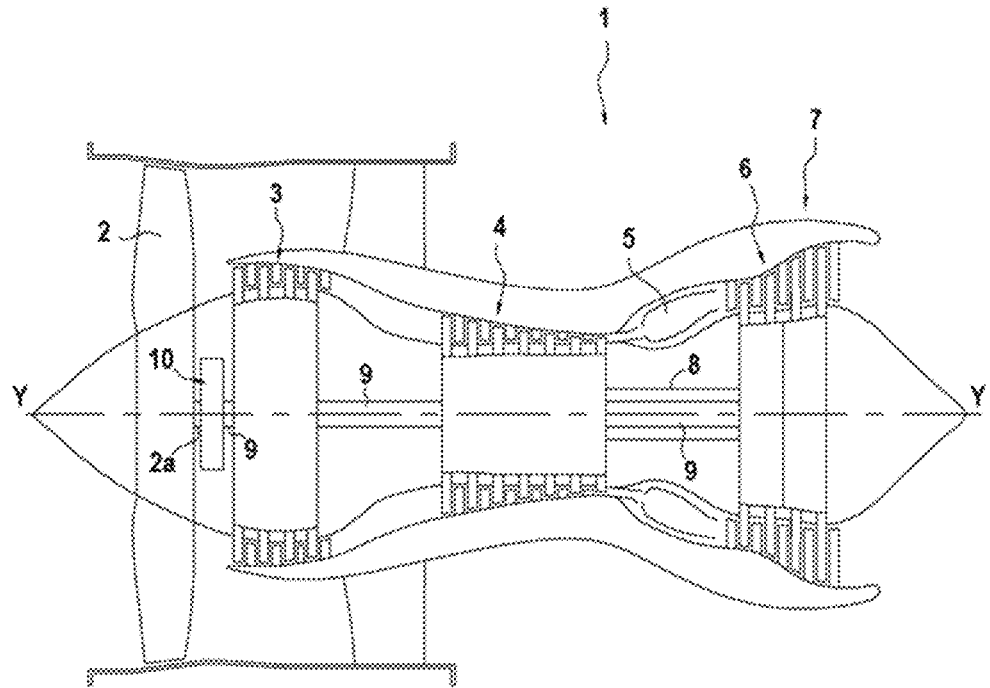
[Fig. 2]
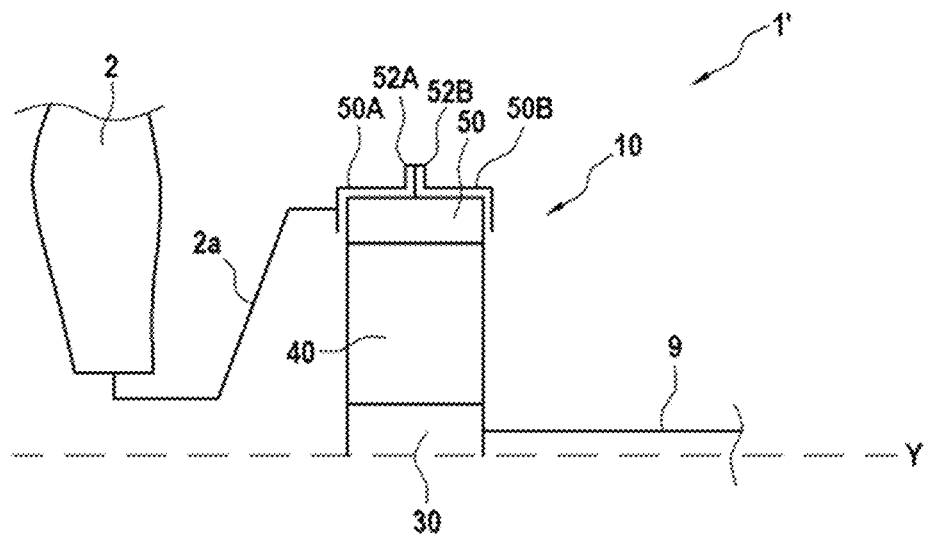

[Fig. 3]
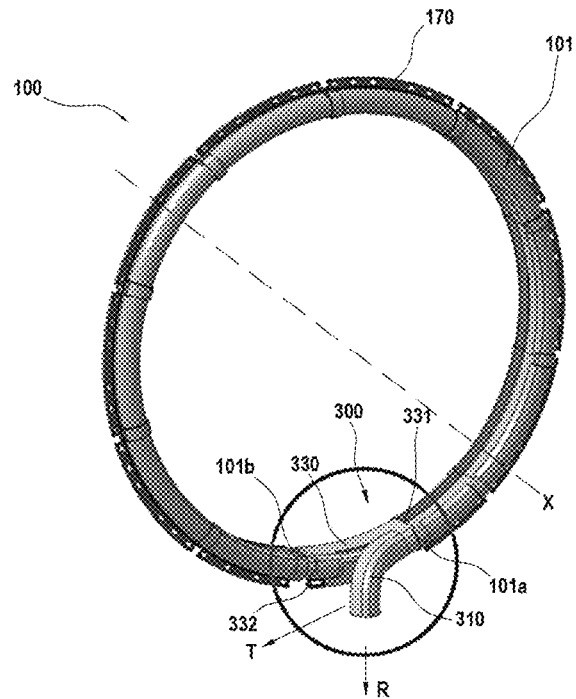
[Fig. 4]
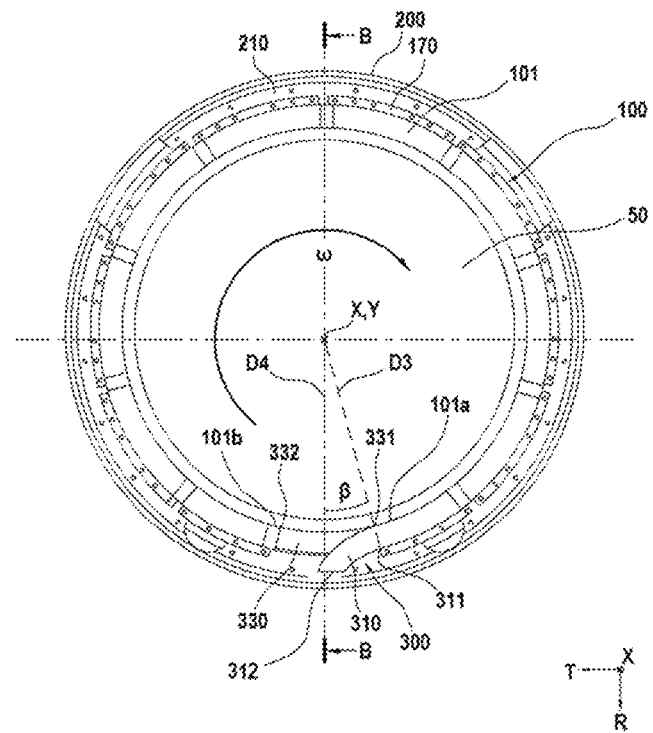

[Fig. 5]
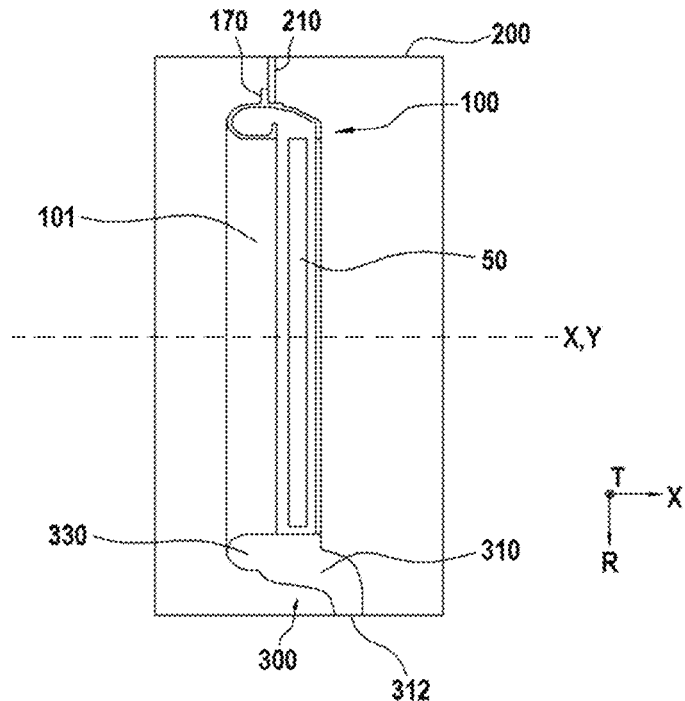
[Fig. 6]
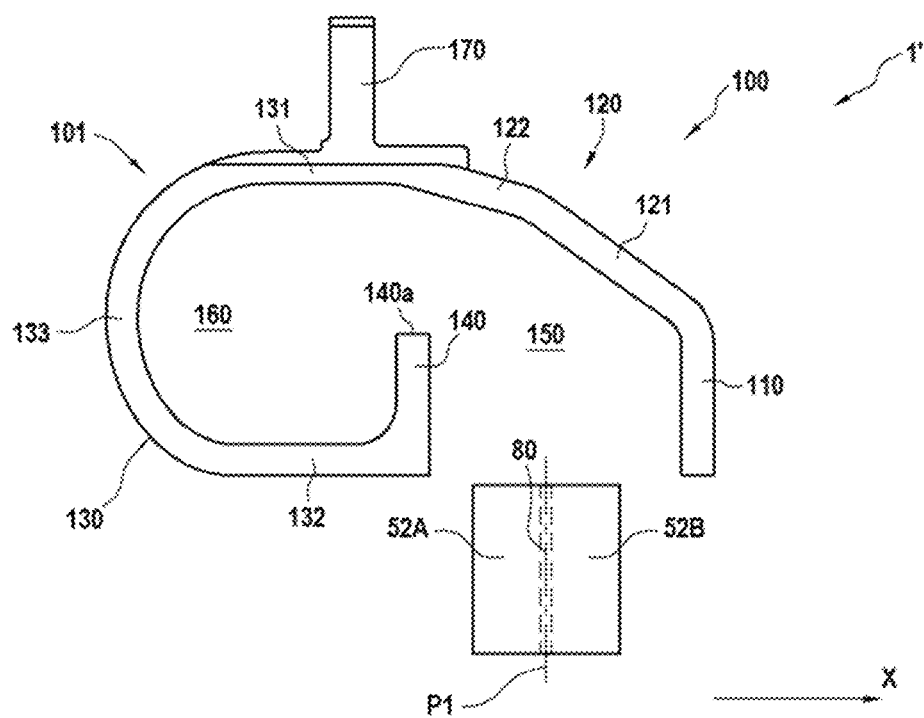

[Fig. 7]
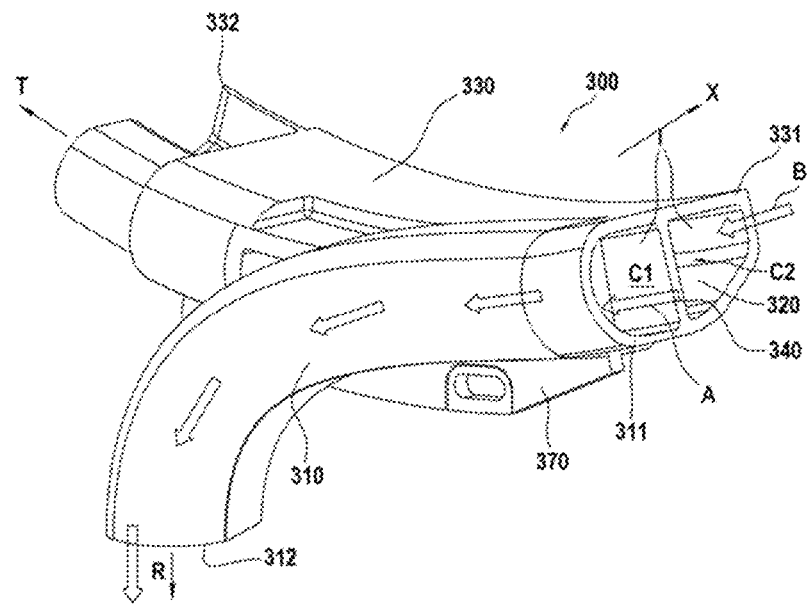
[Fig. 8]
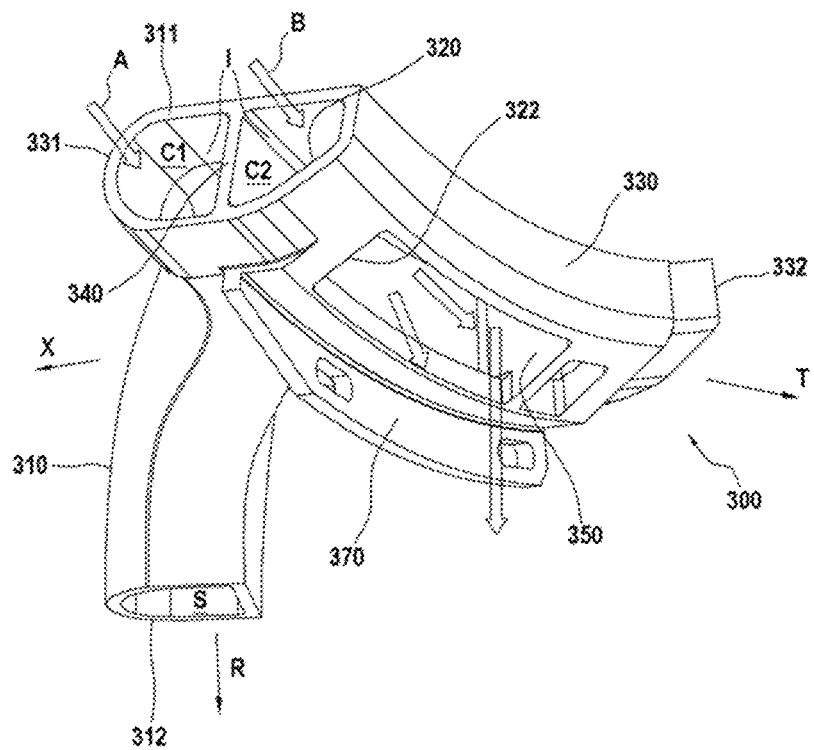

[Fig. 9]
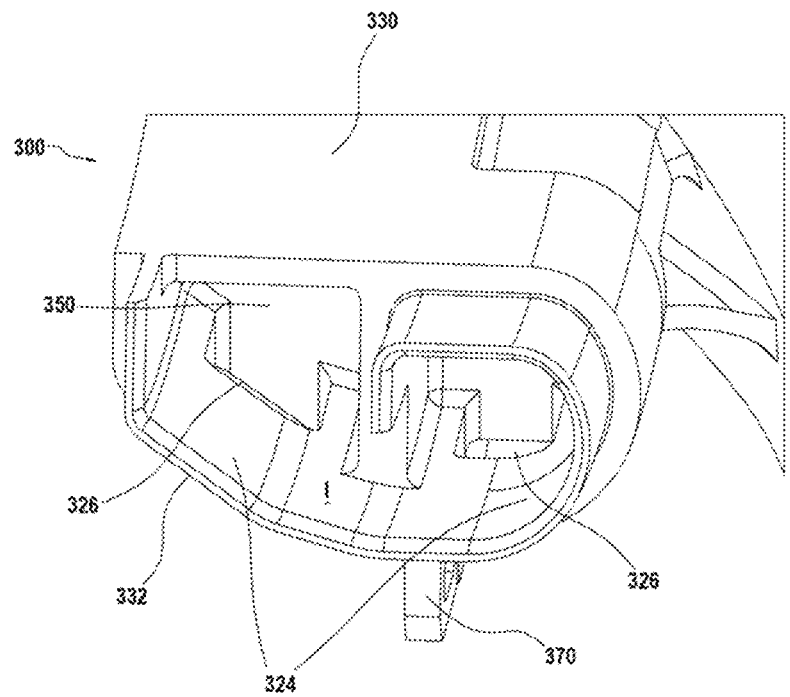
[Fig. 10]
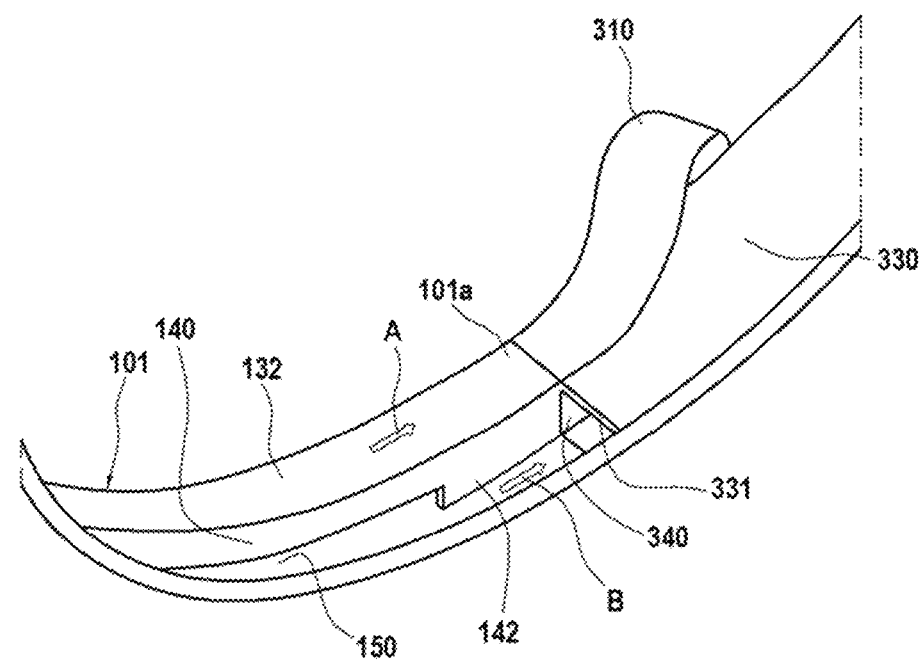

[Fig. 11]
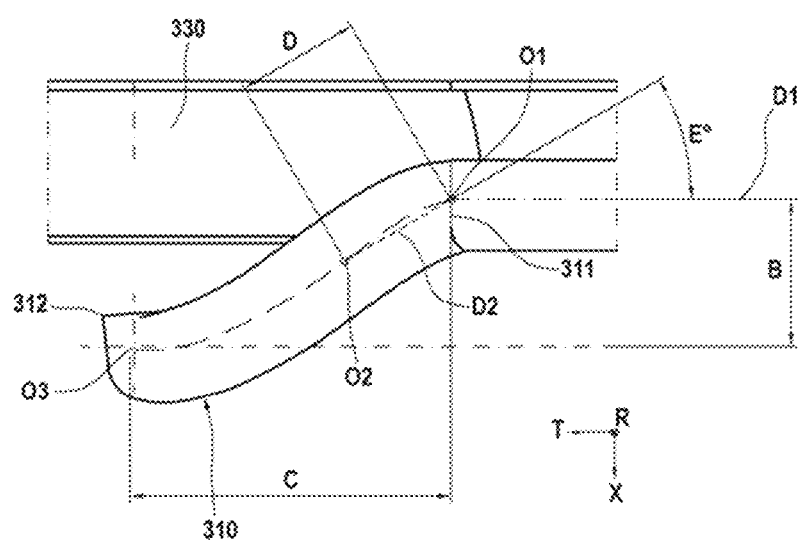

GUTTER FOR RECOVERING LUBRICATION OIL FOR A MECHANICAL REDUCER COMPRISING AN IMPROVED DEFLECTOR

CROSS-REFERENCE TO RELATED APPLICATIONS

This application claims benefit from French Patent Application 22 13106 filed on Dec. 9, 2022, its content being incorporated herein by reference.

TECHNICAL FIELD

The present disclosure relates to the field of mechanical reducers for aircraft turbomachines, such as planetary reducers among others. The present disclosure particularly relates to a gutter for recovering lubrication oil for such a mechanical reducer, comprising a deflector, and a power transmission device comprising such a mechanical reducer and such a gutter.

PRIOR ART

Mechanical reducers are currently used in mechanics, particularly in the field of aeronautics. Their role is to modify the speed and torque ratio between an input shaft and an output shaft of a mechanical system.

The new generations of multi-flow turbomachines, particularly those having a high expansion ratio, include a mechanical reducer to drive the shaft of a fan or of a propeller. Usually, the reducer is used to convert the so-called fast rotation speed of the shaft of a power turbine into a slower rotation speed for the shaft driving the fan.

Such a reducer conventionally comprises a central gear, the so-called "sun gear", an outer ring gear, and gears, so-called "planet gears" which are engaged between the sun gear and the outer ring gear. The planet gears are held by a body known as a planet carrier. The sun gear, the outer ring gear and the planet carrier are planetary members, since their axes of revolution coincide with the longitudinal axis of the turbomachine. On the other hand, the planet gears each have an axis of revolution different from the axis of revolution of the turbomachine, and distributed at regular intervals over the same operating diameter around the axis of the planetary wheels. These axes of the planet gears are parallel to the longitudinal axis of the turbomachine.

There are several architectures of mechanical reducer. The known mechanical reducers, used in bypass turbomachines, are of planetary or epicyclic type. So-called differential architectures also exist. These different types of mechanical reducer can be distinguished as follows:

On a planetary reducer, the planet carrier is fixed and the outer ring gear constitutes the output shaft of the device, which rotates in the reverse direction to the sun gear.

On an epicyclic reducer, the outer gear is fixed and the planet carrier constitutes the output shaft of the device, which rotates in the same direction as the sun gear.

On a differential reducer, no element is rotationally fixed. The outer ring gear rotates in the opposite direction to the sun gear and to the planet carrier.

In a planetary reducer in particular, the lubrication and cooling oil used to lubricate the different wheels of the reducer is generally evacuated by centrifugal force by way of radial channels formed in a flange of the outer ring gear. To prevent the oil from being sprayed outward and to limit losses, it is known to use oil-recovering gutters disposed around the flange of the outer ring gears, used to recover the oil sprayed by centrifugal force.

However, existing gutters do not make it possible to recover the oil satisfactorily. In particular, some gutters do not make it possible to retain the oil, which can then fall back onto the rotary parts of the reducer under gravity. Other gutters can partially retain the oil, but are not able to prevent a significant quantity of sprayed oil from bouncing off the walls of the gutter given the centrifugal acceleration and the tangential ejection speed of the oil, and falling back onto the rotary parts. However, when the oil ducted by a gutter falls back onto a rotary part (the ring gear, the ring gear carrier, or the flange of the ring gear for example) it can cause non-negligible losses by transfer of momentum. Similarly, deflectors disposed on the lower part of the gutter and used to guide the oil from the main part of the gutter to a suction point do not make it possible to recover the oil in a sufficiently effective manner.

There is thus a need for a gutter making it possible to at least partly remedy the aforementioned drawbacks.

SUMMARY OF THE INVENTION

The present disclosure relates to a gutter for recovering lubrication oil, particularly for a mechanical reducer of an aircraft turbomachine, comprising an annular main body around a central axis, and a deflector attached to the main body and configured to allow the evacuation of the oil radially from an inner cavity of the main body toward the outside of the gutter, the deflector comprising a main sleeve disposed in the extension of the main body, and an evacuation channel configured to deflect oil from the main sleeve and having a curved shape such that a first end of the evacuation channel, communicating with the inner cavity, is tangent to the main body, and a second end of the evacuation channel is directed outward with respect to the annular main body.

It will be understood that the second end of the evacuation channel is directed radially outward, or in a substantially radial direction outward with respect to the annular main body.

In the present disclosure, the terms "radial", "axial", "tangent" and their derivatives are considered along the central axis of the annular main body of the gutter, or along the main axis of rotation of the mechanical speed reducer described further on. Thus, a radial direction is a direction perpendicular to the central axis, and the expression "outward" or "radially outward" means that the oil is evacuated radially away from the central axis.

Similarly, the terms "upward", "downward", "lower", "upper" and their derivatives are considered with respect to a vertical direction, corresponding to the normal direction of gravity. It will therefore be understood that the deflector is preferably attached to a lower portion of the main body, in such a way as to recover the oil flowing downward through the inner cavity of the main body.

In this respect, it will be understood that the inner cavity of the main body is the cavity used to recover the oil sprayed by the mechanical reducer, and through which said recovered oil circulates. This recovered oil therefore flows downward through the inner cavity, in the direction of the deflector.

It will moreover be understood that the main sleeve is disposed in the extension of the main body, while having a radius of curvature equal to the radius of curvature of said main body. The main sleeve can form a single part with the main body, and be in other words a portion of said main body, or can be a distinct part of the main body while being attached thereto.

Conversely, the evacuation channel deviates with respect to the main sleeve, and therefore with respect to the main body. More precisely, the first end of the evacuation channel is disposed in the extension of the main body while being tangent thereto, then gradually deviates, due to its curved shape, from the first end all the way to the second end.

It will thus be understood that, in a front view of the gutter parallel to the central axis, the evacuation channel has a first curvature, for example in a semicircle, contained in a plane perpendicular to the central axis. In other words, the curvature of the evacuation channel comprises a tangential component and a radial component making it possible to gradually deflect the oil from the main body toward the outside of the gutter.

This architecture of the deflector, and particularly the shape of the evacuation channel, makes it possible to deflect and gradually guide the lubrication oil from the main body of the gutter toward a suction point outward of the gutter making it possible to collect the oil recovered by the gutter and to re-use this oil. This gradual guiding makes it possible to limit the slowing of the oil and the risk of accumulation of the oil (so-called "jamming" effect) which can lead to overflow of the gutter. It is thus possible to improve the recovery rate of the oil, and to reduce the losses.

In certain embodiments, the curved shape of the evacuation channel comprises an axial component such that the evacuation channel is configured to deflect oil from the main sleeve in the direction of the central axis.

It will thus be understood that, in a top view of the deflector perpendicular to the central axis, the evacuation channel has a second curvature contained in a plane parallel to the central axis. In other words, the curvature of the evacuation channel comprises a tangential component, an axial component and a radial component making it possible to gradually deflect the oil from the inner cavity of the main body, laterally with respect to the main body and with respect to the main sleeve, then radially outward of the gutter.

This configuration makes it possible to further improve the oil recovery rate, and to reduce the losses, by positioning the outlet point of the oil recovered by the gutter as near as possible to the suction point, and facing the latter. Thus, the axial component provides flexibility in the incorporation of the reducer into the enclosure surrounding the reducer, by disposing the oil outlet vertical to the suction point. Moreover, it is thus possible to free up space under the deflector, in particular making it possible to dispose an attachment flange to attach the gutter to a casing by way of the deflector.

In certain embodiments, an oil deflection angle of the evacuation channel with respect to the main sleeve is an angle between a first straight line tangent to the annular main body and perpendicular to the central axis, and a second straight line connecting a first point of a line of mean curvature of the evacuation channel to a second point disposed along said line of mean curvature, the first point belonging to the first straight line and being disposed at the first end of the evacuation channel and the second point being located at a distance D from the first point 0<D≤30 mm, the deflection angle being less than 40°.

It will be understood that the deflection angle defines the deviation, lateral or tangential (i.e. the deflection with respect to the tangent to the main body), of the evacuation channel with respect to the main sleeve, or with respect to the main body. This deflection angle value of less than 40° allows the gradual guiding of the oil during its passage from the inner cavity of the main body of the gutter toward the inlet of evacuation channel, limiting the turbulence generated during this deflection and thus improving the effectiveness of recovery of the oil.

In certain embodiments, a distance B between the first end and the second end of the evacuation channel in a direction parallel to the central axis, and a distance C between said first and second ends in a direction perpendicular to the central axis and to a radial direction of the annular main body, are such that B<C. This relationship B<C allows the gradual guiding of the oil thus further improving the effectiveness of recovery of the oil.

In certain embodiments, the evacuation channel has, between the first end and the second end, a closed section S.

It will be understood that whatever the section S of the evacuation channel under consideration between the inlet and the outlet of said channel, said section S is closed. In other words, the evacuation channel does not comprise any opening between its first and its second end, such that the oil cannot escape during its passage through the evacuation channel. This makes it possible to further improve the effectiveness of the guiding of the oil out of the gutter. Preferably, the section of the evacuation channel is dimensioned as a function of the oil flow to be recovered, to ensure a flow speed between 1.5 and 5 m/s in the channel when it is saturated.

In certain embodiments, in a view parallel to the central axis, an angle ß between a straight line passing through the central axis and the first end of the evacuation channel, and a straight line passing through the central axis and the second end of the evacuation channel, is such that 5°<β<120°.

It will be understood that the view parallel to the central axis is equivalent to a front view of the gutter. One also considers, for the first and the second end, a central point of the inlet section and of the outlet section of the evacuation channel respectively. The angle β is therefore the angular range over which the evacuation channel extends, in this front view. These values allow for the gradual guiding of the oil between its intake by the deflector and its ejection radially outward of the gutter.

In certain embodiments, the main sleeve encloses an inner chamber communicating with the inner cavity of the main body of the gutter, a radial separating wall separating the inner chamber into a first oil collection chamber in fluid communication with the evacuation channel, and a second oil collection chamber comprising a bottom wall having an evacuation opening.

Preferably, the first collection chamber forms the first end of the evacuation channel, i.e. the portion of the evacuation channel disposed in the extension of the inner cavity of the main body and tangent to the main body. In other words, the first end of the evacuation channel is coincident with the main sleeve, before the evacuation channel deviates from said main sleeve toward the second end of the evacuation channel.

It will thus be understood that the radial separating wall, which is a wall extending in a radial plane perpendicular to the central axis, makes it possible to hermetically and axially separate the first chamber and the second chamber, such that a portion of the oil flowing through the inner cavity of the main body toward the deflector is deflected from one side of the radial wall toward the first chamber. i.e. toward the evacuation channel, and another portion of the oil is deflected toward the second chamber, and evacuated from this latter by way of the evacuation opening. Thus, even if a greater quantity of oil is evacuated by the evacuation channel, it is possible to recover the oil also by way of the evacuation opening, thus improving the recovery rate.

In certain embodiments, the inner cavity of the main body of the gutter comprises an intake chamber and an evacuation cavity communicating with the intake chamber over at least a part of the circumference of the main body, the intake chamber being configured to recover the lubrication oil coming from the reducer and deflect it toward the evacuation cavity, the evacuation cavity communicating with the first collection chamber and the intake chamber communicating with the second collection chamber.

Since intake chamber deflects the oil sprayed by the reducer toward the evacuation cavity, it will be understood that most of the oil coming from said reducer flows toward the deflector via the evacuation cavity, such that most of the oil recovered in the main body of the gutter is evacuated via the evacuation channel of the deflector. In other words, most of the oil recovered by the gutter can benefit from the advantages of the architecture of the deflector, being gradually guided to the suction point via the evacuation channel.

Furthermore, the portion of the oil remaining in the intake chamber, i.e. which has not been deflected from the intake chamber toward the evacuation cavity or which has looped back into the evacuation cavity and returned to the intake chamber, can also be evacuated to the outside via the second collection chamber and the evacuation opening.

In certain embodiments, the main body comprises a segregating wall separating the intake chamber and the evacuation cavity over a portion of the circumference of the main body upstream of the deflector.

It will be understood that the evacuation cavity communicates with the intake chamber over most of the circumference of the main body, except over a portion upstream of the deflector and adjacent thereto, where the segregating wall prevents communication between the evacuation cavity and the intake chamber.

Thus, the portions of the oil respectively flowing through the intake chamber and into the evacuation cavity are separated and isolated from one another by way of the segregating wall, even before they are taken into the first and the second collection chamber of the deflector. This makes it possible to further increase the quantity of oil evacuated via the evacuation channel, and thus further improve the recovery rate.

In certain embodiments, the main body comprises, in a section plane parallel to the central axis, a first radial wall extending radially with respect to the central axis, and at least one inclined wall extending from an outer radial end of the first radial wall, a guide portion having an overall U shape extending from an end of the inclined wall, and a second radial wall extending radially outward with respect to the central axis from an end of the guide portion, a space delimited by the first radial wall, the second radial wall and the inclined wall forming the lubrication oil intake chamber, and a space delimited by the guide portion and the second radial wall forming the lubrication oil evacuation cavity.

The first radial wall and the second radial wall extend radially, i.e. perpendicularly to the central axis. In other words, the first radial wall and the second radial wall are annular walls extending in a radial plane perpendicular to the central axis. The first and the second radial wall are therefore mutually parallel.

It will moreover be understood that the inclined wall is inclined with respect to the first radial wall from which it extends, and therefore inclined with respect to the radial direction. The inclined wall therefore has a frustoconical shape that flares outward from the first radial wall.

Moreover, it will be understood that the guide portion extends at a first of its ends from the inclined wall, all the way to the second radial wall at a second of its ends. The U shape can in particular have two lateral walls and a curved bottom. It will thus be understood, according to these features, that the main body of the gutter has an overall G shape along the section plane parallel to the central axis.

Thus, the presence of the first and of the second radial wall, mutually parallel, form an input section making it possible to effectively recover, in the intake chamber, the lubrication oil sprayed when the recovering gutter is disposed around a mechanical reducer. Furthermore, the inclined wall makes it possible to deflect the ejected oil toward the U-shaped guide portion, the latter then guiding the oil, given its shape, toward the bottom of the evacuation cavity formed between the guide portion and the second radial wall.

The configuration of the main body of the gutter for recovering lubrication oil according to the disclosure, with an overall G or snail shell shape, thus makes it possible to improve the effectiveness of the recovery of the oil ejected by the mechanical reducer in operation, by avoiding the oil falling back onto the rotary parts of the reducer under gravity, and by limiting the quantity of oil bouncing off the walls of the gutter, and effectively guiding the oil toward the deflector. It is thus possible to limit efficiency losses at the reducer by transfer of momentum of the oil and therefore further improve the recovery rate.

In certain embodiments, the main sleeve has a first end attached to a first circumferential end of the main body, and a second end attached to a second circumferential end of the main body, the main sleeve comprising a circumferential separating wall separating the first end of the main sleeve from its second end.

It will be understood that the annular main body forms an open ring, its two circumferential ends being connected by the main sleeve of the deflector to which they are attached. The circumferential separating wall makes it possible to prevent the oil reaching the deflector via the first end of the main sleeve from rising back up into the main body in the opposite direction, via the second end of the main sleeve. The circumferential separating wall thus makes it possible to promote the evacuation of the oil via the evacuation channel or via the evacuation opening, and thus to further improve the recovery ratio.

In certain embodiments, the second collection chamber at least is isolated from the second end of the main sleeve by the circumferential separating wall, a bottom wall of the main sleeve between the second end of the main sleeve and the circumferential separating wall comprising at least one radial evacuation hole.

In other words, the first and the second collection chamber are disposed on the side of the first end of the main sleeve with respect to the circumferential separating wall, the latter preventing the second collection chamber from communicating with the second end of the main sleeve. The first collection chamber does not communicate with the second end of the main sleeve either, but communicates solely with the evacuation channel. Thus, the portion of the oil flowing through the inner cavity of the main body of the gutter toward the deflector, and being collected via the second end of the main sleeve not communicating with the first and the second collection chamber, can be evacuated to the outside via the at least one radial evacuation hole.

The present disclosure also relates to a power transmission assembly for an aircraft turbomachine, comprising:

- a mechanical reducer comprising a central gear and an outer ring gear coaxial with one another around a main axis of rotation, and planet gears meshing with the central gear and the outer ring gear, the outer ring gear comprising two half-ring gears each having an outer annular flange attached to one another,
- at least one radial oil ejection channel formed between the annular flanges and configured to eject lubrication oil by centrifugal force,
- a gutter as claimed in any of the preceding embodiments, radially disposed around the annular flanges, such that the inner cavity of the gutter is radially facing the first radial oil ejection channel.

Since the annular gutter, particularly the main body, is disposed around the outer ring gear, and particularly around the annular flanges, the central axis of the gutter and the main axis of rotation of the reducer are coaxial. It will moreover be understood that the outer annular flanges extend radially outward, i.e. in a direction perpendicular to the main axis of rotation, a radial plane comprising the joining interface between the annular flanges and being perpendicular to the main axis of rotation.

The radial oil ejection channel can be a hole formed at the joining interface between the outer annular flanges of the outer ring gear, in a radial direction perpendicular to the main axis of rotation. Moreover, the mechanical speed reducer is preferably a planetary or differential reducer, the outer ring gear then rotating about the central axis. Consequently, during the rotation of the outer ring gear, the lubrication oil circulating in the mechanical reducer can be evacuated radially outward by centrifugal force, by way of the radial oil ejection channel, in the direction of the gutter, in particular toward the intake chamber disposed radially facing the radial oil ejection channel.

In certain embodiments, the deflector is disposed in a lower part of the gutter, in such a way that the second end of the evacuation channel is disposed vertical to the main axis of rotation in a direction of gravity, the first end of the evacuation channel being offset with respect to the second end by an angle ß in a direction opposite to the direction of rotation of the outer ring gear, where 5°<β<120°.

Given the kinetic energy transferred to the oil by the rotation of the outer ring gear, the oil ejected by the latter will preferentially flow through the inner cavity of the main body of the gutter in a direction identical to the direction of rotation of the ring gear. In other words, most of the oil ejected by the outer ring gear flows through the inner cavity in the direction of rotation of the outer ring gear. The fact of offsetting the first end of the evacuation channel with respect to the second end in a direction opposite to the direction of rotation of the outer ring gear therefore makes it possible to improve the effectiveness of the device and to improve the recovery rate of the oil.

Moreover, a smaller quantity of oil can flow through the inner cavity of the main body of the gutter under gravity in the direction opposite to the direction of rotation of the outer ring gear, and be evacuated via the radial evacuation hole or holes formed in the bottom wall of the main sleeve.

The present disclosure also relates to an aircraft turbomachine comprising a power transmission device as claimed in any of the preceding embodiments.

BRIEF DESCRIPTION OF THE DRAWINGS

The invention and its advantages will be better understood on reading the detailed description given below of different embodiments of the invention given by way of non-limiting examples. This description refers to the appended pages of figures, wherein:

FIG. 1 is an axial section view of a turbomachine comprising a planetary reducer, FIG. 2 schematically represents a detail view of the turbomachine of FIG. 1, particularly of a power transmission device comprising the planetary reducer of FIG. 1, FIG. 3 shows a perspective view of a gutter according to an embodiment of the invention, FIG. 4 schematically represents a front view of an assembly comprising an oil-recovering gutter according to the invention, carried by a casing and disposed around the outer ring gear of the planetary reducer, FIG. 5 schematically represents a lateral view in a section plane B-B of the assembly of FIG. 4, FIG. 6 schematically represents a cross section of the main body of the oil-recovering gutter of the invention.

FIG. 7 shows a top perspective view of the deflector of the oil-recovering gutter of the invention, FIG. 8 shows a bottom perspective view of the deflector of the oil-recovering gutter of the invention, FIG. 9 shows a bottom partial perspective view of the deflector of the gutter of FIGS. 7 and 8, at an opposite end.

FIG. 10 shows a partial perspective view of the gutter of the invention, at a joint between the deflector and the main body of the gutter, FIG. 11 schematically represents a top plane view of the deflector.

DESCRIPTION OF THE EMBODIMENTS

In the remainder of the description, the terms "radial", "axial", "tangential", "inner", "outer" and their derivatives are considered with respect to the central axis X of the gutter 100 described hereinafter, or of the main axis of rotation Y of the mechanical reducer 10. Thus, a radial direction R is perpendicular to the central axis X, and an axial direction is parallel to the central axis X. Similarly, a radial wall is perpendicular to the central axis X, and an axial wall is parallel to the central axis X. Furthermore, a tangential direction T is perpendicular to the central axis X and to the radial direction R.

Moreover, the terms "upward", "downward", "lower", "upper", "top" or "bottom" and their derivatives are considered with respect to a vertical direction, corresponding to the normal direction of gravity. In particular, the lower parts of the gutter correspond to the regions located at the bottom on the figures.

FIG. 1 shows, in section along a vertical plane passing through its main axis Y, an aircraft turbomachine, in particular a bypass turbojet engine with a reducer 1. It includes, from upstream to downstream along the circulation of the air stream, a fan 2, a low-pressure compressor 3, a high-pressure compressor 4, a combustion chamber 5, a high-pressure turbine 6, and a low-pressure turbine 7.

In such a reducer turbojet engine 1, the high-pressure turbine 6 drives the high-pressure compressor 4 using a high-pressure shaft 8. The low-pressure turbine 7, also known as the fast turbine, meanwhile drives the low-pressure compressor 3, also known as the fast compressor, using a low-pressure shaft 9. The fast turbine 7 also drives the rotor shaft 2a of the fan 2 by way of a mechanical speed reducer 10 (more simply known as "mechanical reducer 10" in the remainder of the description). In this way, the fan 2 can be driven at a low speed, which is favorable from the aerodynamic point of view, while the low-pressure compressor 3 can be driven at a greater speed, which is favorable from a thermodynamic point of view. The mechanical reducer 10 can be a planetary mechanical reducer 10. Alternatively, the mechanical reducer can be an epicyclic gear reducer, or a differential reducer. Note moreover that the invention is applicable to mechanical reducers comprising single-unit planet or "cage and cage holder" type carriers.

FIG. 2 shows, in section and along the same vertical plane passing through its main axis Y, a schematic detail view of the turbojet engine 1 of FIG. 1, particularly of the power transmission device 1' comprising the mechanical reducer 10, and FIG. 6 shows, in addition to the gutter 100 described in detail further on, a detail view of a radially outer end of the device 1' of FIG. 2.

The mechanical reducer 10 is for example a two-stage planetary gear box forming a gear box known by the acronym RGB (Reduction Gear Box). Certain parts, such as planet carriers or the casing surrounding the reducer, are masked to simplify the description. The mechanical reducer 10 comprises a sun gear 30, comprising a plurality of teeth on its radially outer face, and an outer ring gear 50 comprising a plurality of teeth on its radially inner face. The sun gear 30 and the outer ring gear 50 are coaxial and axisymmetric around the main axis of rotation Y. The mechanical reducer 10 further comprises planet gears 40, conventionally at least three, each being disposed between the sun gear 30 and the outer ring gear 50, while being in engagement with the latter gears, and each rotating about an axis of rotation substantially parallel to the main axis of rotation Y.

Conventionally, the outer ring gear 50 comprises two half-ring gears 50A, 50B, each comprising an outer annular flange 52A, 52B. The two half-ring gears 50A, 50B are assembled by way of the outer annular flanges 52A, 52B and axial attaching means such as screws and nuts (not shown).

Furthermore, the sun gear 30 is coupled to the low-pressure shaft 9, and the outer ring gear 50 is coupled to the fan 2 by way of the rotor shaft 2a.

Moreover, in this example, the outer annular flange 52B of the other of the two half-ring gears 50B is attached to a radial flange of another rotary part (not shown), for example a part making it possible to duct the mechanical reducer 10.

In such a reducer 10, the lubrication oil which is used to lubricate and cool the different bearings and teeth of the reducer 10 is generally sprayed by centrifugal force through the outer ring gear 50. To facilitate the ejection of this oil, radial oil ejection channels are formed through the outer ring gear 50, particularly via radial oil ejection planes formed between the different radial flanges.

More precisely, in this example, a radial plane P1 is formed by the joining interface between the outer annular flanges 52A, 52B of the half-ring gears 50A, 50B. Note that this invention is also applicable to configurations comprising several radial oil ejection planes. Radial oil ejection channels 80 (only one is visible in FIG. 6) are formed in this radial plane P1, and are circumferentially distributed around the main axis of rotation Y. The radial oil ejection plane P1 is perpendicular to the main axis of rotation Y.

After ejection of the lubrication oil radially outward via the radial oil ejection channels 80 and in the absence of any gutter, the oil then trickles under gravity to the bottom of an enclosure formed by the casing 200 surrounding the reducer, where it can be pumped toward the reducer to be used again. This recovering method does however have drawbacks related to the absence of control of the oil spray. Moreover, the oil can also fall back, at least partially, on rotary parts, thus giving rise to additional unwanted losses.

To limit these drawbacks, an annular oil-recovering gutter 100 (more simply known as a gutter 100 in the remainder of the description) is disposed around the outer ring gear 50, and makes it possible to collect the oil sprayed by the radial oil ejection channels 80. The gutter 100 according to the invention is described with reference to FIGS. 3 to 12.

FIG. 3 shows a perspective view of the gutter 100, and FIG. 4 schematically represents a front view, parallel to the central axis X of the gutter 100, of an assembly comprising the outer ring gear 50, the gutter 100 and a fixed casing 200 of the turbojet engine 1, carrying the gutter 100. The front view corresponds to a view in the plane TR perpendicular to the central axis X, defined by the tangential T and radial R directions.

Moreover, FIG. 5 schematically represents a lateral section view of this assembly, perpendicularly to the central axis X, in a section plane B-B of the assembly of FIG. 4. The lateral view corresponds to a view in the plane XR defined by the axial X and radial R directions. Note that when the gutter 100 is disposed in the turbojet engine 1, particularly in the power transmission device 1' around the outer ring gear 50, the central axis X of the gutter 100 is coaxial and collinear with the main axis of rotation Y of the reducer 10, in other words of the turbojet engine 1.

The gutter 100 comprises, over its radially outer periphery, an annular flange 170 attached to an annular flange 210 of the casing 200 (deliberately shown in a simplified manner) disposed along a radially inner face of said casing 200. Thus, the gutter 100 attached to the fixed casing 200 is itself fixed and immovable with respect to the casing 200 of the turbojet engine 1.

Furthermore, the gutter 100 comprises, on the one hand an annular main body 101 around the central axis X, and on the other hand, in its lower part, an evacuation duct, hereinafter known as the deflector 300 attached to the main body 101. The oil deflected into the evacuation cavity 160 described hereinafter can thus drain along it under gravity all the way to the deflector 300 by which it can be evacuated toward a suction point on the outside of the mechanical reducer 10 without falling back on the various mechanical members thereof, and where applicable be reused to lubricate these mechanical members again.

Moreover, the gutter 100 is radially disposed around the outer ring gear 50, such that the outer annular flanges 52A, 52B are disposed radially facing an input section of the gutter 100 used to recover the oil ejected by way of the radial oil ejection channels 80.

In this regard, the gutter 100, and particularly the main body 101 and the deflector 300, according to an embodiment of the invention has a particularly advantageous shape.

Firstly, the main body 101 is illustrated in more detail in FIG. 6, showing a cross section, perpendicular to an azimuthal direction, of the main body 101 disposed facing a radially outer end of the outer ring gear 50, particularly the outer annular flanges 52A, 52B thereof. Note that to simplify the description hereinafter, focused on the structure and the geometry of the main body 101 of the gutter 100, certain elements such as the casing 200 or the lower part of the outer ring gear 50 are deliberately masked in FIG. 6. In fact, apart from the gutter 100, only the radial ends of the radial flanges 52A, 52B of the outer ring gear 50 are shown.

The term "radially facing" should be understood to mean that the outer annular flanges 52A, 52B, in particular the radial channels 80 and the radial oil ejection plane P1, are disposed at the same axial position along the central axis X as the input section of the gutter 100, and particularly its intake chamber 150 described hereinafter, in such a way as to recover the oil ejected by said radial oil ejection channels 80.

Moreover, the main body 101 has, along this section, the overall shape of a G or else of a snail. It particularly comprises a first radial wall 110, of annular shape around the central axis X. An inclined wall 120, of frustoconical shape, extends from a radially outer end of the first radial wall 110, a radially inner wall of the first radial wall 110 being a free end. Note that in this non-limiting example, the inclined wall 120 is formed as two parts, and comprises two inclined walls 121, 122.

Moreover, a guide portion 130 extends from a radially outer end of the inclined wall 120. The guide portion 130 has, along this section of the gutter 100, an overall U shape. In particular, the guide portion 130 comprises a first axial wall 131 extending from the radially outer end of the inclined wall 120 in a direction moving away from the first radial wall 110, a curved wall 133 extending from one axial end of the first axial wall 131, this portion of the gutter then making a U-turn such as to return toward the first radial wall 110, and a second axial wall 132 extending from the other end of the curved wall 133 in the direction of the first radial wall 110.

The gutter 100 finally comprises a second radial wall 140 extending radially outward from one axial end of the second axial wall 132, of annular shape around the central axis X. The first radial wall 110 and the second axial wall 140 are mutually parallel and perpendicular to the central axis X. They are each disposed axially on either side of the assembly formed by the assembly of the radial flanges 52A, 52B.

Thus, the first and second radial walls 110, 140 form an input section of the gutter 100, through which passes the oil ejected by the radial oil ejection channels 80, and making it possible to effectively recover this oil.

In particular, the first radial wall 110, the inclined wall 120, and a first face of the second radial wall 140, delimit an intake chamber 150, into which is taken the oil ejected by the radial oil ejection channels 80. Furthermore, the guide portion 130 and a second face, opposite the first face, of the second radial wall 140, delimit a lubrication oil evacuation cavity 160, into which the oil coming from the intake chamber 150 is transferred and can accumulate. In particular, the oil ejected and sprayed by the radial oil ejection channels 80 then hits the inclined wall 120. Due to the inclination thereof, the oil hitting the inclined wall 120 is deflected toward the evacuation cavity 160. The oil is then guided by the U-shaped guide portion 130, particularly by the curved wall 133, toward the bottom of said evacuation cavity 160.

In particular, the second radial wall 140 forms a lateral wall of a guide bowl used to guide the oil to the deflector, the second axial wall 132 forming the bottom of this bowl. In this regard, a radial opening between the radially outer end 140a of the second radial wall 140, and the first axial wall 131 allows the oil to pass from the intake chamber 150 to the evacuation cavity 160, after deflection by the inclined wall 120. Note however that over a portion of the circumference of the main body 101, this radial opening is closed by a segregating wall 142 (FIG. 10), preventing the intake chamber 150 and the evacuation cavity 160 from communicating with one another. The segregating wall 142 is a wall extending through a radial plane perpendicular to the central axis X, and preferably extends over at least 10% of the circumference of the main body 101, upstream of the deflector 300 described hereinafter, along a direction of flow of the oil from the main body 101 to the first end 331 of the main sleeve 330 of the deflector 300.

Given the architecture described above, most of the oil recovered by the gutter 100 flows into the evacuation cavity 160, thus forming a main flow A flowing downward in the direction of the deflector 300. A smaller quantity of oil remains in the intake chamber 150 and forms a secondary flow B.

Secondly, the deflector 300 will be described in detail in the remainder of the description, particularly with reference to FIGS. 4 and 7 to 11.

The deflector 300 comprises a main sleeve 330 attached to the main body 101, and extending circumferentially between a first end 331 and a second end 332. The main sleeve 330 is disposed in the extension of the main body 101 and has the same radius of curvature as the main body. More precisely, the first end 331 of the main sleeve 330 is attached to a first circumferential end 101a of the main body 101, for example by interlocking or by welding, and the second end 332 of the main sleeve is attached to a second circumferential end 101b of the main body 101, for example by interlocking or by welding.

The main sleeve 330 comprises an inner enclosure I. A circumferential separating wall 350, disposed in the inner enclosure I, separates the first end 331 and the second end 332 of the main sleeve 330, preventing the oil from circulating from the first end 331 of the main sleeve 330 to the second end 332, and conversely.

Moreover, on the side of the first end 331 of the main sleeve 330 with respect to the circumferential separating wall 350, the main sleeve 330 comprises a radial separating wall 340 disposed in the inner enclosure I, and separating the inner enclosure I into a first oil collection chamber C1 (hereinafter referred to as the first chamber C1), and a second oil collection chamber C2 (hereinafter referred to as the second chamber C2) comprising a bottom wall 320 having an evacuation opening 322. The first chamber C1 is in fluid communication with the evacuation cavity 160 and collects the main flow A (the trajectory of which is shown by arrows in FIG. 7). The second chamber C2 is in fluid communication with the intake chamber 150 and collects the secondary flow B (the trajectory of which is shown by arrows in FIGS. 7 and 8).

The radial separating wall 340, which is a wall extending in a radial plane perpendicular to the central axis X, makes it possible to hermetically and axially separate the first chamber C1 and the second chamber C2, such that the portion of the oil flowing through the evacuation cavity 160 of the main body 101 toward the deflector 300 is deflected on one side of the radial separating wall 340 toward the first chamber C1, and the portion of the oil flowing through the intake chamber 510 of the main body 101 is deflected from the other side of the radial separating wall 340 toward the second chamber C2. Thus, the secondary oil flow B entering the second chamber C2 is evacuated from this chamber by way of the evacuation opening 322 formed in the bottom wall 320, the oil moreover being blocked tangentially by the circumferential separating wall 350, and thus being forced to be evacuated through the evacuation opening 322.

Furthermore, the radial separating wall 340 is disposed in the extension of the segregating wall 142 of the main body 101, while being preferably in contact with the main body (FIG. 10). Thus, the portions of the oil flowing in the intake chamber 150 and in the evacuation chamber 160 respectively are separated and isolated from one another by way of the segregating wall 142, even before they are taken into the first and the second collecting chamber C1, C2.

Moreover, the deflector 300 comprises an evacuation channel 310 attached to the main sleeve 330 and deviating therefrom. The evacuation channel 310 extends between a first end 311 through which the main flow A of lubrication oil is taken in, and a second end 312 through which the oil is evacuated. The first end 311 can be in the extension of the first chamber C1, or be coincident with the latter, as illustrated in FIGS. 7 and 8 in particular. In other words, in this case, the first end 311 of the evacuation channel 310 is coincident with the first end 331 of the main sleeve 330, being located in one and the same plane as this sleeve.

Thus, at the first end 311, the evacuation channel 310 is tangent to the main body 101 and particularly to the evacuation cavity 160, along the tangential direction T. More precisely, a line of mean curvature of the evacuation channel 310 is such that, at the first end 311, the line of curvature is tangent to the line of mean curvature of the evacuation cavity 160 of the main body 101 and in the extension of this line of curvature.

Furthermore, at the second end 312 of the evacuation channel 310, said line of mean curvature of the evacuation channel 310 is directed downward and radially with respect to the central axis X, in the radial direction R.

Thus, in a front view of the gutter 100 parallel to the central axis X, the evacuation channel 310 has a first curvature contained in the plane TR perpendicular to the central axis X, defined by the tangential T and radial R directions (FIG. 4). In other words, the curvature of the evacuation channel 310 comprises a tangential component and a radial component making it possible to deflect and gradually guide the oil from the main body 101 toward the outside of the gutter 100, particularly toward a suction point.

The curvature of the evacuation channel 310 with respect to the main sleeve 330 also comprises an axial component. More precisely, in a top view of the deflector 300 perpendicular to the central axis X (FIG. 11), the evacuation channel 310 has a second curvature contained in the plane TX formed by the axial X and tangential T direction, perpendicular to the radial direction R. In other words, the curvature of the evacuation channel 310 comprises both a tangential component, an axial component and a radial component making it possible to gradually deflect the oil from the evacuation cavity 160 of the main body 101.

Moreover, in this top view of the deflector 300 in the plane TX, an oil deflection angle E° tangential to the evacuation channel 310, i.e. the deflection of the evacuation channel 310 with respect to the tangential direction T (in other words with respect to the main sleeve 330) and in the axial direction X, is defined as follows.

The deflection angle E° of the evacuation channel is an angle between a first straight line D1 perpendicular to the central axis X and to the radial direction R, preferably tangent to the annular gutter 100 at a first point O1 of the line of mean curvature of the evacuation channel 310, and a second straight line D2 connecting the first point O1 to a second point O2 disposed along said line of mean curvature. The first point O1 is disposed at the first end 311 of the evacuation channel 310 and substantially corresponds to an inflection point of a mean line of oil flow, and the second point O2 being located at a distance D from the first point O1 where 0<D≤30 mm.

Thus, the deflection angle E° in this view is less than 40°. In other words, whatever the position of the second point O2 along the line of mean curvature, as long as the distance D between the first point and the second point is such that 0<D≤30 mm, the deflection angle E° remains less than 40°. The fact that D is less than or equal to 30 mm means that only the upstream part of the evacuation channel 310, with respect to the direction of flow of the oil from the main body 101 to the second end 312 of the evacuation channel 310, is considered. Note that the tangential deflection is also visible in FIGS. 8 and 10.

Along this same view in the plane TX, the length B is the distance between the first end 311 and the second end 312 of the evacuation channel 310 in the axial direction parallel to the central axis X. In other words, B is the distance between the first point O1, and a third point O3 located on the line of mean curvature of the evacuation channel 310, in the output plane of the evacuation channel 310 at its second end 312. Similarly, the length C is the distance between the points O1 and O3 in the tangential direction T perpendicular to the central axis X and to the radial direction R, with B<C.

It will be understood that in the present disclosure, the evacuation channel has a leftward curving shape, having the shape of a trumpet extending in the three dimensions of space. Consequently, a distance between the first end 311 and the second end 312 of the evacuation channel 310 comprises three components, including the distances B and C. In other words, in a top view of the deflector 300, in the plane XT, B corresponds to the axial component of the distance between the first and the second end 311, 312, and C corresponds to the tangential component.

Moreover, the evacuation channel 310 has, between the first end 311 and the second end 312, a closed section S (FIG. 8). In other words, whatever the section S of the evacuation channel 310 considered between the inlet and the outlet of said channel, the evacuation channel 310 does not comprise any opening, such that the oil cannot escape during its passage through the evacuation channel 310.

Moreover, the section of the evacuation channel is dimensioned according to the flow of oil to be recovered, to ensure a flow speed between 1.5 and 5 m/s in the duct when it is saturated.

Additionally, in a front view of the gutter 100, parallel to the central axis X, i.e. in the plane TR (FIG. 4), an angle ß between the straight line D3 passing through the central axis X and the first end 311 of the evacuation channel 310 (for example the first point O1), and a straight line D4 passing through the central axis X and the second end 312 (for example the third point O3) of the evacuation channel 310, is such that $5° < \beta < 120°$.

It will be understood that the straight line D4 extends in the radial direction R, corresponding to a vertical direction with respect to the direction of gravity. The angle β is therefore the angular range over which the evacuation channel 310 extends between its ends 311, 312, in this front view.

In addition, the deflector 300 is disposed in a lower part of the gutter 300 when the latter is disposed around the outer ring gear 50 of the reducer 10, in such a way that the second end 312 of the evacuation channel 310 is disposed vertical to the main axis of rotation Y, in other words of the central axis X. Thus, the first end 311 of the evacuation channel 310 is offset with respect to the second end 312 of the angle β, in a direction opposite to a direction of rotation w of the outer ring gear 50.

In other words, in the front view of the gutter 100, the angular range ß over which the evacuation channel 310 extends is not centered on the vertical axis, i.e. on the straight line D4, corresponding to the direction of gravity, but is offset along the circumference of the gutter 100 in the direction opposite to the direction of rotation w of the outer ring gear 50 of the reducer 10. In other words, the first end 311 of the evacuation channel 310, through which the oil is collected, is closer to the apex of the gutter 100 than the second end 312 of the evacuation channel 310 through which the oil is evacuated, said second end 312 being vertically aligned with the main axis of rotation Y (or the central axis X).

FIG. 9 shows a partial perspective view of the deflector 300, on the side of the second end 332 opposite the first end 331 with respect to the circumferential separating wall 350. Note in this regard that the structure of the main sleeve 330 at this end has a G shape similar to that of the main body 101 of the gutter 100 described with reference to FIG. 6, and can thus be interlocked in the main body 101 as their shapes fit together.

A bottom wall 324 of the main sleeve 330 between the second end 332 of the main sleeve 330 and the circumferential separating wall 350 comprises at least one radial evacuation hole 326, in this example two radial evacuation holes 326, respectively disposed in the portions of the inner enclosure I located in the extension of the accumulation chamber 150 and of the evacuation cavity 160 of the main body 101.

Note that, according to this non-limiting example, this region of the inner chamber I, on the side of the second end 332 of the main sleeve 330 with respect to the circumferential separating wall 350, does not comprise any radial separating wall, unlike the region of the inner enclosure I on the side of the first end 331 of the main sleeve 330 with respect to the circumferential separating wall 350, which comprises the radial separating wall 340.

Given this architecture of the gutter 100, the lubrication oil used for the lubrication of the reducer 10 is ejected by the rotation of the outer ring gear 50, in the direction of rotation w thereof, preferentially driving the oil in the direction going toward the first end 331 of the main sleeve 330 of the deflector 300. In particular, given the G shape of the main body of the gutter 100, most of the oil ejected and recovered by the gutter 100 flows into the evacuation cavity 160 and is evacuated by the deflector 300 by way of the evacuation channel 310 via the main flow A, while being gradually guided toward the second end 312 in such a way as to be radially evacuated toward a suction point.

In this direction of flow, corresponding to the direction of rotation w of the outer ring gear, a smaller quantity of oil is evacuated by way of the second chamber C2 and by way of the radial opening 322 via the secondary flow B. Moreover, a certain quantity of oil, smaller than the quantity of oil flowing through the gutter 100 in the direction of rotation w, flows through the gutter 100, particularly in the main body 101, in the direction opposite to the direction of rotation w. In this portion of the main body 101 of the gutter, corresponding to the left-hand portion of the straight line D4 in FIG. 4, the oil flows under gravity toward the second end 332 of the main sleeve 330 of the deflector, and is evacuated outside of the gutter via the radial evacuation hole or holes 326.

Note moreover that the deflector 300 may comprise a radial flange 370, disposed under the main sleeve 330, and making it possible to attach the deflector 300 to the annular flange 210 of the casing 200, in the same way as the flange 170 of the main body 101.

Although this invention has been described with reference to specific examples, it is obvious that modifications and changes can be made to these examples without departing from the general scope of the invention as defined by the claims. In particular, individual features of the different embodiments illustrated/mentioned can be combined in additional embodiments. Consequently, the description and drawings must be considered in an illustrative sense rather than a restrictive one.

The invention claimed is:

1. A gutter for recovering lubrication oil, particularly for a mechanical reducer of an aircraft turbomachine, comprising an annular main body around a central axis, and a deflector attached to the main body and configured to allow the evacuation of the oil radially from an inner cavity of the main body toward the outside of the gutter, the deflector comprising a main sleeve disposed in the continuity of the main body, and an evacuation channel configured to deflect oil from the main sleeve and having a curved shape such that a first end of the evacuation channel, communicating with the inner cavity, is tangent to the main body, the evacuation channel then gradually deviating, due to its curved shape, all the way to a second end directed outward with respect to the annular main body, wherein the curved shape of the evacuation channel comprises an axial component such that the evacuation channel is configured to deflect oil from the main sleeve in the direction of the central axis.

2. The gutter as claimed in claim 1, wherein an oil deflection angle of the evacuation channel with respect to the main sleeve is an angle between a first straight line tangent to the annular main body and perpendicular to the central axis, and a second straight line connecting a first point of a line of mean curvature of the evacuation channel to a second point disposed along said line of mean curvature, the first point belonging to the first straight line and being disposed at the first end of the evacuation channel and the second point being located at a distance D from the first point where $0<D\leq 30$ mm, the deflection angle being less than 40°.

3. The gutter as claimed in claim 1, wherein a distance B between the first end and the second end of the evacuation channel in a direction parallel to the central axis, and a distance C between said first and second ends in a direction perpendicular to the central axis and to a radial direction of the annular main body are such that $B<C$.

4. The gutter as claimed in claim 1, wherein the evacuation channel has, between the first end and the second end, a closed section.

5. The gutter as claimed in claim 1, wherein, in a view parallel to the central axis, an angle $\beta$ between a straight line passing through the central axis and the first end of the evacuation channel, and a straight line passing through the central axis and the second end of the evacuation channel, is such that $5°<\beta<120°$.

6. The gutter as claimed in claim 1, wherein the main sleeve encloses an inner chamber communicating with the inner cavity of the main body of the gutter, a radial separating wall separating the inner chamber into a first oil collection chamber in fluid communication with the evacuation channel, and a second oil collection chamber comprising a bottom wall having an evacuation opening.

7. The gutter as claimed in claim 6, wherein the inner cavity of the main body of the gutter comprises an intake chamber and an evacuation cavity communicating with the intake chamber over at least a part of the circumference of the main body, the intake chamber being configured to be disposed at a same axial position along the central axis as a radial oil ejection plane of the reducer in such a way as to recover the lubrication oil coming from the reducer and deflect it toward the evacuation cavity, the evacuation cavity communicating with the first collection chamber and the intake chamber communicating with the second collection chamber.

8. The gutter as claimed in claim 7, wherein the main body comprises a segregating wall separating the intake chamber and the evacuation cavity over a portion of the circumference of the main body upstream of the deflector.

9. The gutter as claimed in claim 7, wherein the main body comprises, in a section plane parallel to the central axis, a first radial wall extending radially with respect to the central axis, and at least one inclined wall extending from an outer radial end of the first radial wall, a guide portion having an overall U shape extending from an end of the inclined wall, and a second radial wall extending radially outward with respect to the central axis from an end of the guide portion, a space delimited by the first radial wall, the second radial wall and the inclined wall forming the lubrication oil intake chamber, and a space delimited by the guide portion and the second radial wall forming a lubrication oil evacuation cavity.

10. The gutter as claimed in claim 6, wherein the main sleeve has a first end attached to a first circumferential end of the main body, and a second end attached to a second circumferential end of the main body, the main sleeve comprising a circumferential separating wall separating the first end of the main sleeve from its second end; and wherein the second collection chamber at least is isolated from the second end of the main sleeve by the circumferential separating wall, a bottom wall of the main sleeve between the second end of the main sleeve and the circumferential separating wall comprising at least one radial evacuation hole.

11. The gutter as claimed in claim 1, wherein the main sleeve has a first end attached to a first circumferential end of the main body, and a second end attached to a second circumferential end of the main body, the main sleeve comprising a circumferential separating wall separating the first end of the main sleeve from its second end.

12. A power transmission assembly for an aircraft turbomachine, comprising:
- a mechanical reducer comprising a central gear and an outer ring gear coaxial with one another around a main axis of rotation, and planet gears meshing with the central gear and the outer ring gear, the outer ring gear comprising two half-ring gears each having an outer annular flange attached to one another,
- at least one radial oil ejection channel formed between the annular flanges and configured to eject lubrication oil by centrifugal force,
- a gutter as claimed in claim 1 radially disposed around the annular flanges, such that the inner cavity of the gutter is radially facing the first radial oil ejection channel.

13. The assembly as claimed in claim 12, wherein the deflector is disposed in a lower part of the gutter, in such a way that the second end of the evacuation channel is disposed vertical to the main axis of rotation in a direction of gravity, the first end of the evacuation channel being offset with respect to the second end by an angle $\beta$ in a direction opposite to the direction of rotation of the outer ring gear, where $5°<\beta<120°$.

* * * * *